United States Patent [19]

Nakamura

[11] Patent Number: 4,544,075
[45] Date of Patent: Oct. 1, 1985

[54] HYDRAULIC PRESSURE CYLINDER WITH INTEGRATED RESERVOIR

[75] Inventor: Kaoru Nakamura, Anjo, Japan

[73] Assignee: Aisin Seiki Kabushiki Kaisha, Kariya, Japan

[21] Appl. No.: 694,919

[22] Filed: Jan. 28, 1985

Related U.S. Application Data

[63] Continuation of Ser. No. 488,621, Apr. 25, 1983, abandoned.

[30] Foreign Application Priority Data

May 7, 1982 [JP] Japan .................. 57-066899

[51] Int. Cl.$^4$ .............. B65D 25/54; B60T 17/22
[52] U.S. Cl. .................. 220/82 R; 220/DIG. 31; 60/534; 73/534; 116/227
[58] Field of Search ............... 60/534, 535, 585, 592, 60/533; 92/170; 220/82 R, 82 A, DIG. 31; 73/334; 116/227

[56] References Cited

U.S. PATENT DOCUMENTS

| | | | |
|---|---|---|---|
| 3,602,257 | 8/1971 | Berleyoung | 220/DIG. 31 |
| 3,802,200 | 4/1974 | Kolm | 60/594 |
| 4,133,287 | 1/1979 | Downs | 60/534 |
| 4,162,616 | 7/1979 | Hayashida | 60/533 |
| 4,335,825 | 6/1982 | Sakazume | 60/534 |
| 4,376,490 | 3/1983 | Mizusaki | 220/82 R |

OTHER PUBLICATIONS

E. Obeda, "How to Get Good Ultrasonic Welds" 11/1964, Modern Plastics.

Primary Examiner—Robert E. Garrett
Assistant Examiner—H. Edward Li
Attorney, Agent, or Firm—Oblon, Fisher, Spivak, McClelland & Maier

[57] ABSTRACT

A hydraulic pressure cylinder with an integrated reservoir which includes a cylinder body of strengthened resin, a reservoir tank of strengthened resin molded with the cylinder body as one body and having a wall portion and an opening formed in the wall portion of the reservoir tank and having a frame portion defined by the opening, and a window plate formed of resin material soluble in said strengthened resin and having a high transparency characteristic, the window plate including a flange which is welded to an inner surface of a wall portion of a reservoir tank and a projecting part which projects from the flange toward an outer surface of the wall portion of the reservoir tank along the frame portion.

3 Claims, 3 Drawing Figures

HYDRAULIC PRESSURE CYLINDER WITH INTEGRATED RESERVOIR

This application is a continuation of application Ser. No. 488,621, filed Apr. 25, 1983, now abandoned.

BACKGROUND OF THE INVENTION

1. Field of the Invention

This invention relates to hydraulic pressure cylinders and more particularly to a hydraulic pressure cylinder for vehicle clutches or vehicle brakes with an integrated reservoir associated therewith.

2. Description of the Prior Art

Conventionally, hydraulic pressure cylinders with integrated reservoirs have been proposed wherein the hydraulic pressure cylinder and the reservoir which are formed of fiberglass strengthened resin are molded as one body in order to have adequate strength for lightweight design. However, since the transparency of the strengthened resin of fiberglass is less, such prior cylinders with an integrated reservoir have a disadvantage in that the fluid level within the reservoir cannot be seen from the outside. Therefore, prior reservoirs of strengthened resin further have been provided with a notched window to which a window plate of resin having high transparency is welded whereby the fluid level within the reservoir can be seen through the window plate from the outside. However, the window plate is arranged so as to be welded to the outer surface of the reservoir, and therefore upon pressure being supplied against the window plate in a given direction, the welded portion of the window plate may be separated. Thus, prior cylinders with integrated reservoirs still have the disadvantage that the window plate may be subject to being separated from the reservoir.

SUMMARY OF THE INVENTION

Therefore, it is an object of the present invention to provide a new and improved hydraulic pressure cylinder with an integrated reservoir which obviates the above-mentioned prior art drawbacks.

It is another object of the present invention to provide a new and improved hydraulic pressure cylinder with an integrated reservoir wherein the fluid level can be easily observed from the outside.

It is still another object of the present invention to provide a new and improved hydraulic pressure cylinder with an integrated reservoir which is simple in construction and low in cost.

To achieve the objects, and in accordance with the purpose of the invention, as embodied and broadly described herein, the hydraulic pressure cylinder with integrated reservoir comprises a cylinder body of strengthened resin and a reservoir tank of strengthened resin molded as one body, an opening formed in a wall portion of the reservoir tank so as to define a frame portion, a window plate being soluble in the above strengthed resin and having a high transparency, the window plate having a flange portion which is melt bonded to an inner surface of the wall portion of the reservoir tank and a part projecting from the flange toward an outer surface of the wall portion along the frame portion. Since the window plate is melt bonded to the inner surface of the wall portion of the reservoir, the window plate receives the pressure in a direction where the welded portion of the window plate is in pressing engagement with the reservoir tank.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENTS

Figure 1:
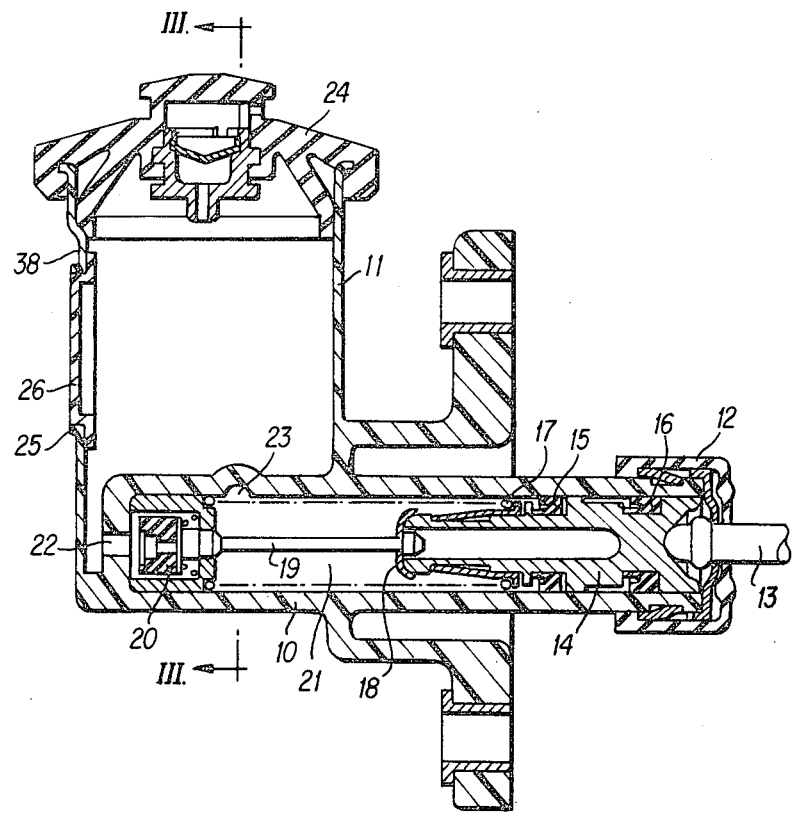
FIG. 1 is a cross-sectional view of a hydraulic pressure cylinder with an integrated reservoir according to the present invention.

Referring to the drawings, the hydraulic pressure cylinder with integrated reservoir according to the present invention is applied as vehicle clutch master cylinder, but may be applied as vehicle brake master cylinder.

Both hydraulic pressure cylinder body 10 and reservoir tank 11 are made of fiberglass strengthened resin such as 6 nylon, 66 nylon and polypropylene and are molded as one body. A piston 14 is slidably disposed within the body 10 through means of primary and secondary sealing cups 15, 16 and is operated by means of a rod 13 which extends within the body 10 by means of a boot 12 and is in association with a brake pedal (not shown). The piston 14 is urged by means of a spring 17 to the right so that a valve member 20 is normally maintained in position by means of a rod 19 which is limited by a stopper 18 mounted on the piston 14 in its opening position where the reservoir tank 11 is in fluid communication with a pressure chamber 21 through means of a passage 22. When the pedal is depressed, the piston 14 is moved to the left and therefore the engagement between the rod 19 and the stopper 18 is released. Thus, the valve member 20 is moved by means of the spring 17 to a position where the passage 22 is closed and the fluid within the pressure chamber 21 is pressurized in response to the leftward movement of the piston 14. Pressurized fluid now prevails at an outlet port 23.

The reservoir tank 11 of substantial annular configuration has a wall portion, a suitable part 38 of which is flat. An opening 25 is formed in the flat part 38 of the wall portion of the reservoir tank 11. A cap member 24 is fitted at the open end of tank 11. A window plate 26 of rectangular shape which is made of resin material as previously described which in turn has high transparency deposited in the opening 25. The materials of the reservoir tank 11 and the window plate 26 may be selected from the above-mentioned materials, however, it is desirable that the material of the window plate 26 has a low melting point in comparison with the material of the reservoir tank 11. For example, if 66 nylon is selected as material of the reservoir tank 11, 6 nylon should be desirably selected as material of the window plate 26.

Figure 2:
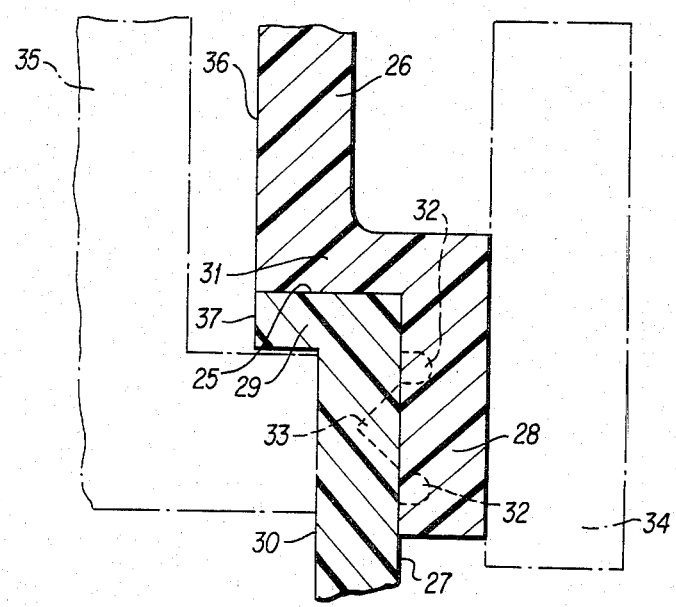
FIG. 2 is an enlarged cross-sectional view of a part of the cylinder of FIG. 1.
Figure 3:
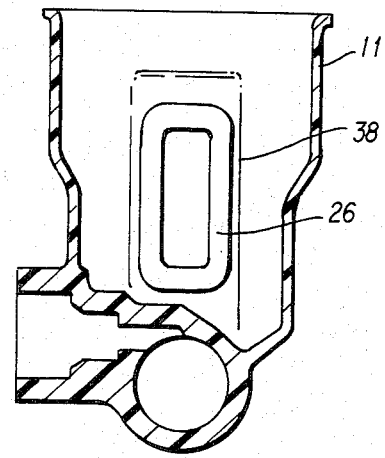
FIG. 3 is a view taken along line III—III of FIG. 1.

As is clearly illustrated in FIG. 2, the window plate 26 has a flange 28 which is melt bonded to an inner surface 27 of the wall portion of the reservoir tank 11 and a projecting part 31 which is projected from the flange 28 toward an outer surface 30 of the wall portion of the reservoir tank 11 along a frame portion 29 defined by the opening 25. Before being melt bonded, the flange 28 has a groove 32 and a projection 33, as shown by the dotted line in FIG. 2. In melt bonding, the reservoir tank 11 and the window plate 26 are positioned as shown in FIG. 2 to a holding block 34 arranged within the reservoir tank 11 and then an ultrasonic welding horn 35 is brought into pressing contact with the outer surface 30 of the reservoir tank 11 whereby the reservoir tank 11 and the window plate 26 are ultrasonically melt bonded. At this time, the projection 33 of the flange 28 is melted and flows into the groove 32 to thereby assure proper welding therebetween. Since the melting point of the window plate 26 is lower than that of the reservoir tank 11, the window plate 26 and the reservoir tank 11 are surely and properly bonded by the weld horn 35 which is pressed from the outer side of the tank 11. In this bonding, melting which may occur between the inner surface 27 of the reservoir tank 11 and the window plate 28 will not be forced out of the side of the outer surface 36 of the window plate 26. Thus, visibility in checking the fluid level through means of the window plate 26 will not be impaired and the aesthetics of the assembly will not be disturbed. The window plate 26 includes the projecting part 31 and the dimensions of the outer surface 36 of the projecting part 31 is such that the outer surface 37 of the window frame 29 and outer surface 36 are formed in a continuous single plane whereby the above-noted visibility is further improved. However, the outer surface 36 may be extended outwardly and may be drawn back inwardly.

Obviously, numerous modifications and variations of the present invention are possible in light of the above teachings. It is therefore to be understood that within the scope of the appended claims, the invention may be practiced otherwise than as specifically described herein.

What is claimed as new and is intended to be secured by letters patent is:

1. A hydraulic pressure cylinder with an integrated reservoir, comprising:
    a cylinder body of strengthened resin;
    a reservoir tank of strengthened resin molded with said cylinder body as one body and having a wall portion, said tank having an opening formed in said wall portion of said reservoir tank so as to define a frame portion;
    a window plate formed of resin material soluble in said strengthened resin, separate from said reservoir tank, having a high transparency characteristic and a lower melting point than that of said reservoir tank, and being mounted on an inner surface of said reservoir tank, said window plate having a flange formed along an entire periphery of said window plate and a projecting part which projects from said flange toward an outer surface of said wall portion of said reservoir tank along said frame portion of said reservoir tank; and
    ultrasonic melt bonded connecting means for connecting said flange to said inner surface of said wall portion of said reseroir tank.

2. A hydraulic pressure cylinder with an integrated reservoir as set forth in claim 1, wherein said wall portion further comprises a flat part at which said frame portion is positioned.

3. A hydraulic pressure cylinder with an integrated reservoir as set forth in claim 1, wherein an outer surface portion of said projecting part is formed as a continuous single plane with an outer surface portion of said frame so as to improve visibility into said reservoir.

* * * * *